(12) United States Patent
Pipkorn et al.

(10) Patent No.: US 8,997,658 B2
(45) Date of Patent: Apr. 7, 2015

(54) WHEELBARROW COVER

(76) Inventors: Randall E. Pipkorn, Bisbee, AZ (US);
Nancy M. Pipkorn, Bisbee, AZ (US)

( * ) Notice: Subject to any disclaimer, the term of this patent is extended or adjusted under 35 U.S.C. 154(b) by 1062 days.

(21) Appl. No.: 12/653,541

(22) Filed: Dec. 16, 2009

(65) Prior Publication Data

US 2011/0139038 A1 Jun. 16, 2011

(51) Int. Cl.
*A47B 23/00* (2006.01)
*B62B 5/00* (2006.01)
*B62B 1/20* (2006.01)

(52) U.S. Cl.
CPC .............. *B62B 5/0013* (2013.01); *B62B 1/20* (2013.01)

(58) Field of Classification Search
CPC .......... A47B 96/02; A47B 13/08; A47B 13/10
USPC ............... 108/42, 90, 11, 12, 13, 14; 296/98; 366/347, 48; 280/47.31
See application file for complete search history.

(56) References Cited

U.S. PATENT DOCUMENTS

| | | | | |
|---|---|---|---|---|
| 935,025 | A * | 9/1909 | Hoban | 248/213.2 |
| 2,175,572 | A * | 10/1939 | Ruhl | 108/90 |
| 3,125,040 | A * | 3/1964 | Roberson | 108/18 |
| 3,751,845 | A * | 8/1973 | van Leeuwen | 297/188.09 |
| 4,627,363 | A * | 12/1986 | Jones | 108/90 |
| 5,004,252 | A * | 4/1991 | Kraper | 108/42 |
| D321,991 | S * | 12/1991 | Menges et al. | D6/335 |
| 6,148,737 | A * | 11/2000 | Bowman et al. | 108/42 |
| 6,547,309 | B1 | 4/2003 | Franklin | |
| 6,575,616 | B2 * | 6/2003 | D'Agostino | 366/347 |
| 6,984,066 | B2 * | 1/2006 | Borom | 108/42 |
| 7,070,316 | B1 | 7/2006 | Roth | |
| 7,290,746 | B1 * | 11/2007 | Macias et al. | 108/42 |
| 7,322,300 | B2 * | 1/2008 | Caeton | 108/90 |
| 7,467,590 | B1 * | 12/2008 | Meller | 108/90 |

* cited by examiner

*Primary Examiner* — Jose V Chen
(74) *Attorney, Agent, or Firm* — Herbert E. Haynes, Jr.

(57) ABSTRACT

A cover of rigid planar configuration is designed for removable placement on the open top of a wheelbarrow for complete closing thereof to protect materials that are oftentimes contained therein from environmental damage. In particular, curable materials such as cement, mortar and the like will begin to cure if left unattended for more than short periods of time and this problem is particularly troublesome in dry climates. The cover is provided with a depending lip for engaging the sides of the wheelbarrow to prevent the cover from siding movement on the wheelbarrow, and tie-down devices can be used to releasably secure the cover on the wheelbarrow. In addition to protecting the contents of the wheelbarrow, the planar surface of the cover can provide a convenient work surface of use on a job site.

8 Claims, 2 Drawing Sheets

WHEELBARROW COVER

BACKGROUND OF THE INVENTION

1. Field of the Invention

The present invention relates to wheelbarrows and more particularly to a removable cover for a wheelbarrow for preventing the damaging effects of the environment on the cargo carried in the wheelbarrow and for providing a working surface for use at a job site.

2. Description of the Prior Art

Wheelbarrows have been in use for many years and are believed to have appeared in Europe about the eleventh or twelfth centuries. Since that time many improvements have been made to ease the workload on the user and some devices have been devised to perform work on the contents of the wheelbarrow. For example, U.S. Pat. No. 7,070,316 to Roth discloses such a device as having a motor mounted atop a safety shield that is carried on the open top of the load receptacle of the wheelbarrow and the shield partially covers the opening of the receptacle. A drive belt extends from the motor down through the safety shield into the wheelbarrow to drive a mixing mechanism carried on the underside of the safety shield for mixing a curable products such as mortar. The safety shield is slidably movable fore and aft on the open top of the load receptacle of the wheelbarrow to bring the mixing mechanism into mixing engagement with all areas of the mortar carried in the load receptacle.

While the safety shield of the above described Roth patent does cover a portion of the open top of the load receptacle of a wheelbarrow, it does not entirely close the open top. Therefore, environmental conditions such as low humidity, rain, and wind can cause damage to the contents of a wheelbarrow. When mortar or other curable products are being use at a job site in a dry climate, the products will begin to cure if left unattended such as during lunch and/or coffee breaks and it can become fully cured if left overnight. Similarly, some materials carried in wheelbarrows can be damaged by rain and wind can scatter other types of materials. Further, the structure described in the Roth patent cannot be left in place to minimize the effects of a dry climate on a curable product such as mortar in that the mixer could become trapped in the cured product.

To the best of our knowledge, no prior art structure has been disclosed or suggested which can be selectively used to close the top of the load receptacle of a wheelbarrow to protect the contents of the wheelbarrow from environmental damage, and in addition, the cover provides a work surface at the job site. Therefore, a need exists for a new and useful wheelbarrow cover for protecting the contents thereof from environmental damage and providing a working surface at the job site.

SUMMARY OF THE INVENTION

As will hereinafter be described in detail, the present invention discloses a removable cover for use on a conventional wheelbarrow. The cover of the present invention is primarily intended to protect the contents of a wheelbarrow from environmental damage during lunch and coffee breaks and other periods of non-use. In particular, in a relatively dry climate with the contents of the wheelbarrow being a curable product such as mortar, workers cannot leave the wheelbarrow unattended for more than short periods of time without the mortar starting to cure. Other environmental conditions such as rain and wind can damage other types of materials which are oftentimes carried in a wheelbarrow. The cover of the present invention is also intended to provide a convenient work surface at a job site which would otherwise not have such a structure.

The cover is a rigid planar structure which is configured to match the shape of the opening at the top of the load receptacle of the wheelbarrow. An endless lip depends from the peripheral edge of the cover for contiguous engagement with the outwardly facing edge of the rim which defines the open top of the load receptacle to keep the cover from sliding movement relative to the load receptacle. For reasons which will hereinafter be described, the cover may also be formed with an endless upstanding lip formed on the peripheral edge of the cover, and upstanding divider walls may be formed on the top surface of the cover to divide the upper surface thereof into a plurality of individual compartments. Also, the cover may be formed with a relatively small opening at one edge thereof to allow the elongated handle of a tool, such as a shovel that is being carried in the wheelbarrow to extend upwardly from the load receptacle of the wheelbarrow.

To prevent the cover from being dislodged such as during transporting of the wheelbarrow, a tie-down means may be used to demountably secure the cover in place atop the wheelbarrow. In a first embodiment, the tie-down means is in the form of a bungee cord having a hook on each of the opposite ends thereof. The bungee cord is positioned underneath the load receptacle of the wheelbarrow with the opposite ends of the bungee cord extending upwardly and the hooks being in engagement with the upstanding endless lip formed on the peripheral edge of the cover. In a second embodiment, the tie-down means is in the form of a pair of spring loaded latches each of which is mounted on a different one of the opposite sides of the cover. The latches demountably engage the rolled over rim formed at the opening of the load receptacle of the wheelbarrow.

As herein before mentioned, in addition to protecting the contents of the wheelbarrow from environmental damage, the cover of the present invention is also intended to provide a convenient work surface at a job site which would otherwise not have such a structure. The previously described upstanding peripheral lip formed on the cover will prevent articles carried on the top of the cover from sliding off, and the multiple compartments formed by the upstanding walls will segregate various articles from each other.

Accordingly, it is an object of the present invention to provide a new and useful cover for use on a conventional wheelbarrow to prevent environmental damage to the contents of the wheel barrow and to provide a convenient work surface at a job site which otherwise not have such a structure. The foregoing object of the present invention will be more fully understood from the following description when read in conjunction with the accompanying drawings.

DESCRIPTION OF THE PREFERRED EMBODIMENTS

Figure 1:
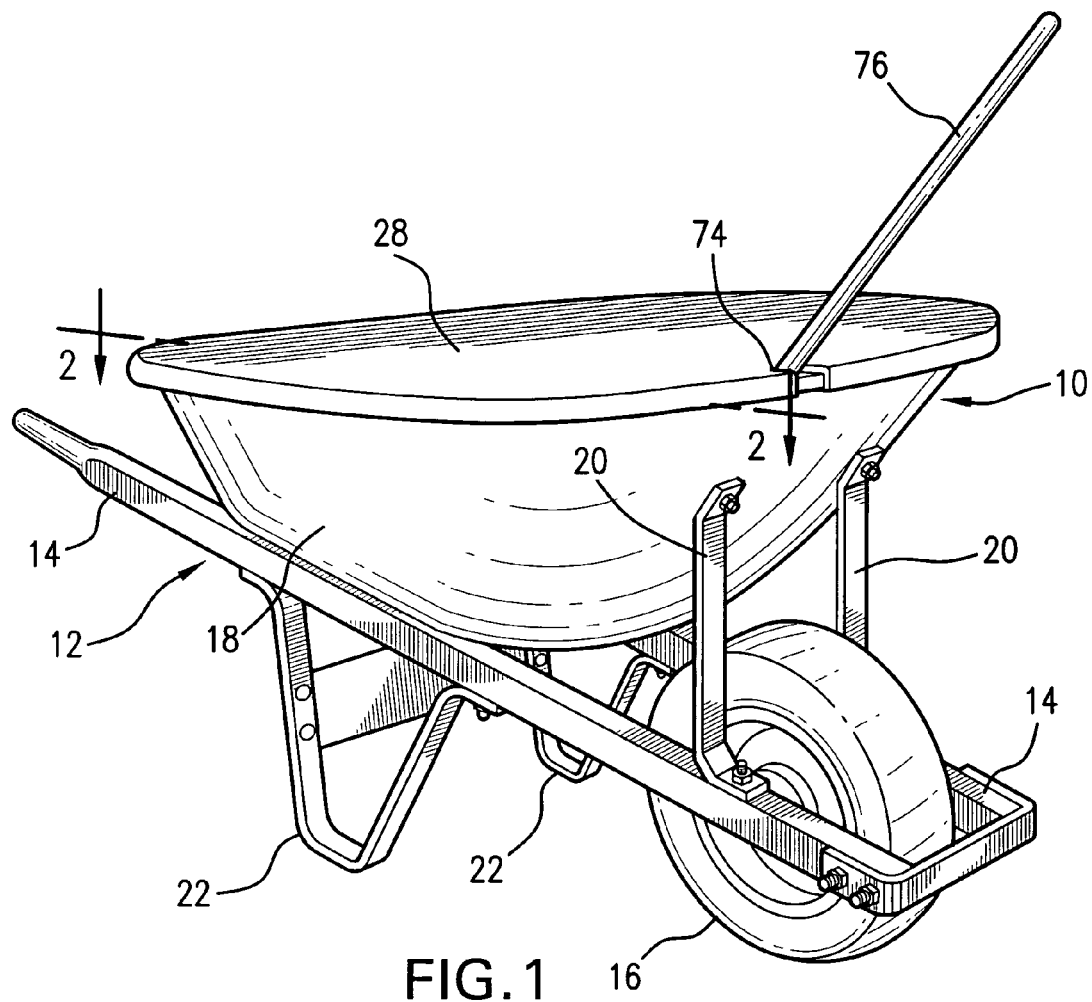
FIG. 1 is a perspective view of a conventional wheelbarrow having the cover of the present invention mounted thereon.
Figure 2:
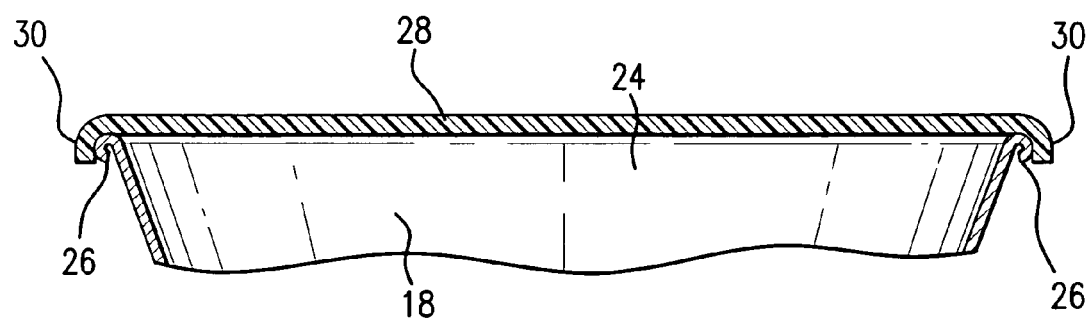
FIG. 2 is an enlarged sectional view taken along the line 2-2 of FIG. 1.

Referring more particularly to the drawings, FIG. 1 shows a wheelbarrow which is indicated generally by the reference numeral 10. The wheelbarrow 10 is of conventional configuration including a frame 12 which is formed of a pair of elongated forwardly converging handle members 14. A wheel unit 16 is mounted between the spaced apart front ends of the handle members 14, and a load receptacle 18 is mounted atop the frame 12. A pair of braces 20 extend from the frame 12 into supporting engagement with the load receptacle 18, and a pair resting legs 22 depend from the frame. As seen best in FIG. 2, the load receptacle 18 is a tub-shaped structure having an open top 24 which is defined by an endless peripheral rim 26.

It is a common practice to use wheelbarrows for mixing cement to form various types of curable products such as concrete, mortar and plaster. For purposes of this description, the use of the phrase "curable mixture" will be understood to stand for any curable product that can be mixed in a wheelbarrow including the cementitious mixtures mentioned above.

In accordance with the present invention, a cover 28 is demountably positioned atop the load receptacle 18 of the wheelbarrow 10 for reasons which will be hereinafter described in detail. The cover 28 is a rigid planar structure which may be molded or otherwise formed of synthetic resin (plastic) fiberglass or any other suitable material. The cover 28 is made to match the shape of the open top 24 of the load receptacle 18. An endless depending lip 30 is provided on the peripheral edge of the cover 28 so that when the cover is mounted on the load receptacle 18, the lip 30 will be in contiguous engagement with the outwardly facing edge of the peripheral rim 26 of the load receptacle 18. In this manner, the cover 28 is prevented from sliding movement relative to the top of the load receptacle 18.

The cover 28 of the present invention is primarily intended to protect the contents of the wheelbarrow 10 from environmental damage during lunch and/or coffee breaks and other periods of non-use. In particular, with a curable mixture being contained in the wheelbarrow, workers cannot leave the wheelbarrow unattended for more than short periods of time without the curable mixture starting to cure and this problem is particularly severe in relatively dry climates. Additionally, environmental occurrences such as rain and wind can damage or scatter other types of materials such as granular products which are oftentimes carried in a wheelbarrow. The cover 28 of the present invention is also intended to provide a convenient work surface at a job site which would otherwise not have such a structure.

Figure 3:
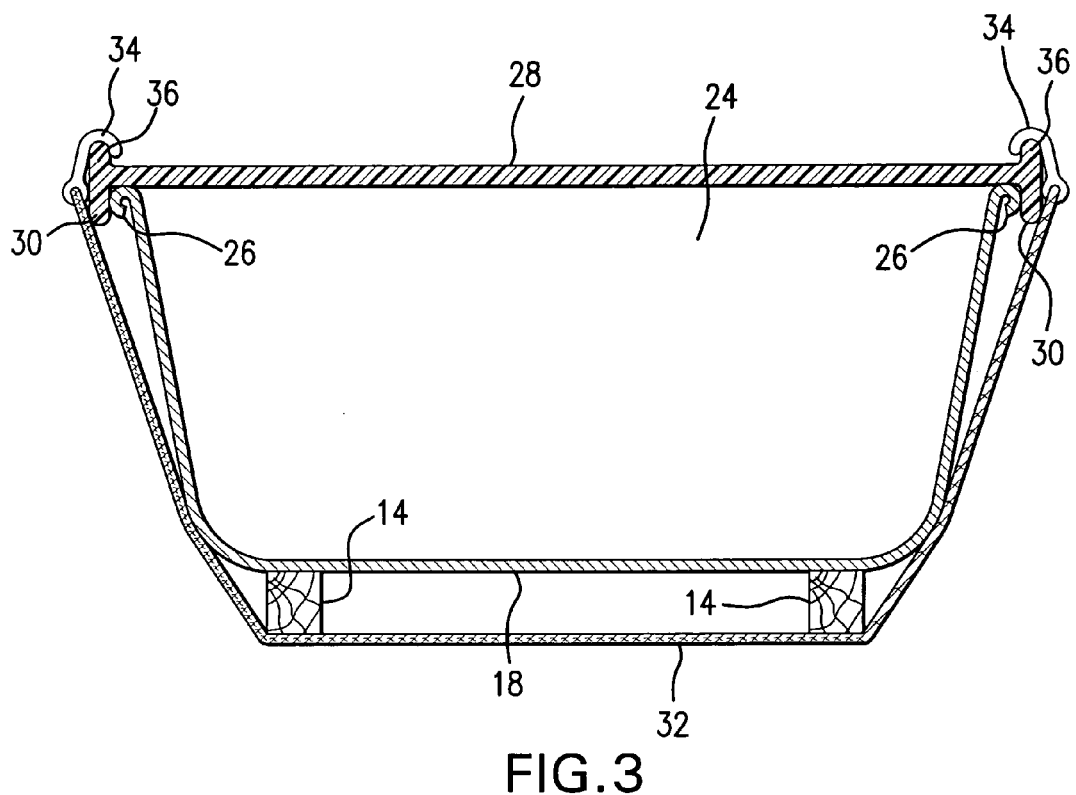
FIG. 3 is a transverse sectional view of the wheelbarrow having the cover of the present invention mounted thereon and showing a first embodiment of the cover tie-down means.

FIG. 3 shows a bungee cord 32 having a hook 34 on each of its opposite ends. The bungee cord 32 is used to provide a first embodiment of a tie-down means for preventing dislodging of the cover 28 such as could occur as a result of severe winds, tipping over of the wheelbarrow or the like. The bungee cord 32 is positioned below the load receptacle 18 of the wheelbarrow 10 with the opposite ends of the cord extending upwardly to position the hooks 34 provided on the opposite ends of the cord in hooked engagement with an endless upstanding lip 36 formed on the periphery of the cover 28. The endless upstanding lip 36 serves a second function, namely it prevents objects (not shown) carried on top of the cover 28 from sliding off the cover.

Figure 4:
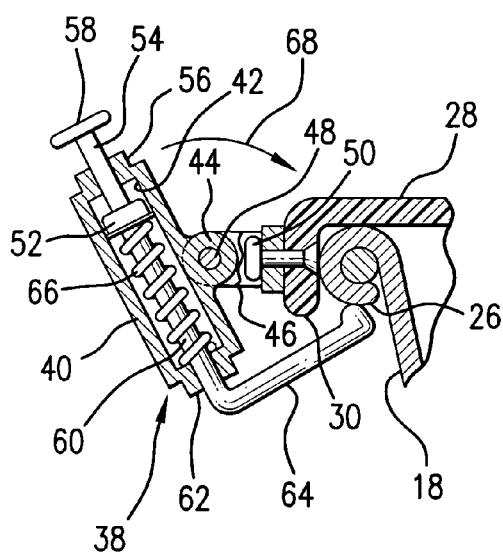
FIG. 4 is a fragmentary sectional view of a portion of the wheelbarrow and the cover and showing one of a pair of latches which form a second embodiment of the cover tie-down means.
Figure 5:
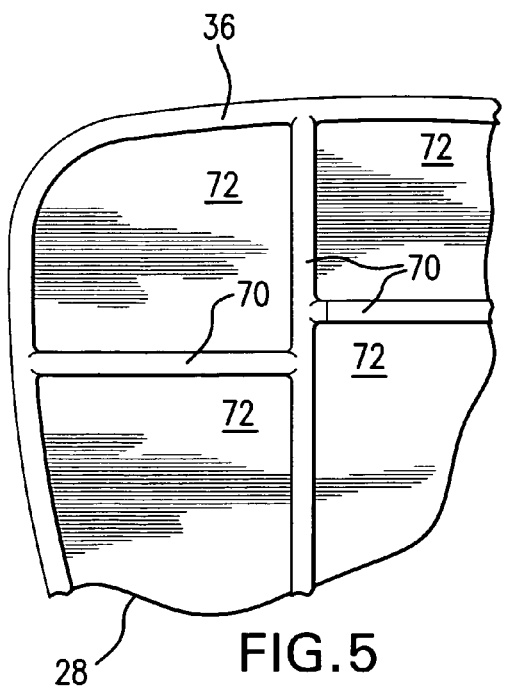
FIG. 5 is a fragmentary plan view of the wheelbarrow cover showing a multiplicity of open top compartments formed thereon.

FIG. 4 shows a second embodiment of a tie-down means in the form of a pair of spring loaded latches 38 (one shown) which are located on opposite sides of the cover 28. It will be understood that the following detailed description of the illustrated latch 38 also applies to the one that is not shown. The latch 38 includes a housing 40 having a bore 42. The housing has a laterally extending ear 44 which is attached to a clevis 46 by means of a pivot pin 48. The clevis 46 is mounted on the depending lip 30 of the cover 28 by means of a suitable rivet 50. A piston 52 is mounted in the bore 42 of the housing 40 and is axially movable therein. A first shaft 54 extends from the top of the piston 52 through a first end 56 of the housing 40 and a pad 58 is provided on the extending end of the shaft 54 by which the piston 52 can be moved manually in the bore 42 of the housing. A second shaft 60 extends oppositely from the piston 52 through the second end 62 of the housing 40 and is bent along its length to form a laterally extending member 64. A spring 66 is carried within the bore 42 of the housing 40 to bias the piston 52 toward the first end 56 of the housing and when in this position, the laterally extending member 64 will be biased into engagement with the peripheral rim 26 of the load receptacle 18 of the wheelbarrow 10 to hold the cover 28 in the tied-down position. To free the cover 28 for removal, the pad 58 is depressed to move the piston 52 against the bias of the spring 66 which moves the laterally extending member 64 out of engagement with the rim 26 of the load receptacle 18. With the laterally extending member 64 moved away from the rim 26, the housing 40 is pivotably moved about the pivot pin 48 in the direction of the arrow 68 to move the laterally extending member 64 out from under the rim 26 so that the cover is free to be removed from the wheelbarrow 10.

As previously mentioned, in addition to protecting the contents of the wheelbarrow 10 from damage, the cover 28 provides a convenient work surface for use at a job site. The upper surface of the cover 28 is of planar configuration as seen best in FIGS. 1 and 2, and is ideally suited to carry or store other articles (not shown) to be used at a job site. The previously described endlessly upstanding lip 36 keeps articles carried on the cover 28 from sliding off of the cover. Further, the top of the cover 28 can be formed with upstanding divider walls 70 to provide a plurality of individual compartments 72 for segregating different types of articles from each other.

As seen in FIG. 1, the cover 28 can be formed with a small opening 74 adjacent one edge thereof so that a long handle 76 of a tool such as a shovel can be carried in the wheelbarrow.

While the principles of the invention have now been clear in illustrated embodiments, many modifications will be obvious to those skilled in the art which do not depart from those principles. The appended claims are therefore intended to cover such modifications within the limits only of the true spirit and scope of the invention.

What we claim is:

1. A cover for a wheelbarrow comprising in combination:
   a) a wheelbarrow having an open top which is defined by a peripheral rim; and
   b) a cover configured to substantially match the shape of the open top of said wheelbarrow, said cover being removably mountable on the open top of said wheelbarrow for complete closing thereof to protect the contents that can be carried in said wheelbarrow from environmental damage.

2. A cover for a wheelbarrow as claimed in claim 1 and further comprising said cover having a relatively small opening formed therein adjacent one edge of said cover through which the handle of a tool protrudes when such an implement is being carried in said wheelbarrow.

3. A cover for a wheelbarrow as claimed in claim 1 wherein said cover is of rigid planar configuration to provide a work surface for use at a job site which lacks a work surface.

4. A cover for a wheelbarrow as claimed in claim 3 wherein said cover further comprises:
   a) an endless upstanding lip at the periphery of said cover; and
   b) a plurality of upstanding walls formed on said cover and arranged to divide the surface thereof into individual compartments.

5. A cover for a wheelbarrow as claimed in claim 1 and further comprising tie-down means connected to said cover and said wheelbarrow for releasably retaining said cover on said wheelbarrow when said cover is mounted thereon.

6. A cover for a wheelbarrow as claimed in claim 5 wherein said tie-down means comprises:
   a) an endless lip depending from the periphery of said cover for engaging the outwardly facing edge of the peripheral rim which defines the opening of the load receptacle of said wheelbarrow when said cover is mounted thereon; and
   b) as pair of spring loaded latches each mounted on an opposite outwardly facing depending side of said endless lip, said pair of spring loaded latches being operable for attachment to the peripheral rim which defines the opening of the load receptacle of said wheelbarrow when said cover is mounted thereon.

7. A cover for a wheelbarrow as claimed in claim 5 wherein said tie-down means comprises:
   a) an endless upstanding lip at the periphery of said cover: and
   b) a bungee cord having a hook on each of its opposite ends, said bungee cord being for positioning below the load receptacle of said wheelbarrow with its opposite ends extending upwardly with the hooks engaging said endless upstanding lip when said cover is mounted thereon.

8. A cover for a wheelbarrow as claimed in claim 1 and further comprising:
   a) said cover being of rigid planar configuration shaped to substantially match the shape of the open top of said wheelbarrow; and
   b) an endless lip depending from the periphery of said cover for engaging the outwardly facing edge of the peripheral rim which defines the open top of said wheel barrow when said cover is placed thereon.

\* \* \* \* \*